Patented Aug. 29, 1939

2,171,306

UNITED STATES PATENT OFFICE 2,171,306

WELDING ROD

Glenn V. Ireland, Wauwatosa, Wis.

No Drawing. Application October 17, 1936,
Serial No. 106,162

16 Claims. (Cl. 219—8)

This invention relates to welding rods or electrodes suitable for use in arc welding.

One of the objects of the invention is the provision of a new and improved arc welding electrode including novel material for coating the same.

A further object of the invention is the provision of a welding rod of such material and coated with such a composition that the weld when completed, although made on cast metal without preheating, will be of relatively soft material whereby it may be machined.

Another object of the invention is the provision of a new and improved welding rod having a minimum amount of carbonaceous material in the coating surrounding the rod and in the binder for securing such material to the rod.

A further object of the invention is the provision of a new and improved welding rod that will permit of a continuous and more rapid welding operation than is possible with the conventional welding rods now in use.

A still further object of the invention is the provision of a new and improved welding rod that is inexpensive to manufacture, efficient in use, and that produces a weld that is free from checks or cracks and that is sufficiently soft to be readily machined if desired.

Other and further objects and advantages of the invention will appear from the following specification which is intended to disclose the invention in language containing words of description but which are not to be construed as words of limitation except as defined by the claims.

Welding on cast iron by the electric arc process has not been done commercially to any extent. The reason for this is that satisfactory results have not been obtainable. The deposits are so hard that they cannot be machined and in addition they frequently crack. These results are due to the formation of a layer of hard white iron during the cooling operation. If the casting itself does not crack, there are likely to be cracks in the weld metal that will spread to the casting and cause failures. The present invention is especially adapted for welding cast iron, but may be used with good results in welding wrought iron, steel and the like.

In the use of the conventional rods for welding cast iron, the metal of the weld, or at least a large portion of the metal deposited, especially that portion in contact with the metal that is being welded, is white iron ($Fe_3C$) of considerable thickness, and because of the strained condition to which the weld is subjected, the metal of the weld, being hard and brittle, is likely to crack, break or chip off. Furthermore, the metal is so hard that it is extremely difficult to machine. In the present invention, the formation of this extremely hard metal in the weld is eliminated.

In the preparation of the rod, a coating of suitable materials held on the rod by a binder is employed. It has been discovered by experiment that unless the coating materials and the binder for retaining the same on the rod contain a minimum amount of carbon or carbon in such forms that it will not unite with the iron in the rod, the material of the rod will, in the molten state during the welding operation, combine with the carbon to form white iron.

For instance, clear, quick drying lacquer of the type used in coating iron, when used as a binder, produces a soft deposit, whereas the use of lacquer colored black by carbon pigment, or where rosin, finely ground coal, or charcoal, and the like, are used in the coating, a deposit of extremely hard and brittle material will result.

It has also been proposed to employ welding rods covered with a coat that during the welding operation deposits a heavy slag on the weld. This is objectionable also because in certain welds, this slag must be removed and this requires time and expense. Furthermore, it is common practice to preheat cast metal before welding it. This operation, of course, adds considerably to the expense of the welding operation and often retards the work.

The present invention seeks to remedy these difficulties by the provision of a rod that will produce a weld of soft metal with a minimum of slag and without the necessity of preheating the metal.

The welding rod to be used is preferably, though not necessarily, wrought iron, but plain, low carbon steel or low carbon nickel steel are also suitable. The lower the carbon content of the steel, the better the results and the softer the deposits. These rods are coated by a suitable composition which includes essentially the compounds of boron, iron and sodium, held on the rods by a suitable binder, preferably of non-carbonaceous material.

Preferably, one or more de-oxidizing agents are also added to the coating composition. Such materials as ferro-silicon, ferro-manganese, phosphor-copper, magnesium, aluminum, ferro-titanium and boron alloys have been found to give satisfactory results.

The following formulas, given below, have been found to be operative in producing a weld on cast metal that has a minimum amount of slag and that is soft enough that it may be machined.

The following formula gives only fairly satisfactory results:

*Formula No. 1*

| | Parts by weight |
|---|---|
| Borax | 50 |
| Oxide of iron ($Fe_2O_3$) | 25 |
| Bicarbonate of soda | 25 |

The following formulas give eminently satisfactory results:

*Formula No. 2*

| | Parts by weight |
|---|---|
| Borax | 29 |
| Oxide of iron | 14 |
| Bicarbonate of soda | 14 |
| Copper chloride | 7 |
| Phosphor-copper (15%) | 25 |
| Molybdic oxide ($MoO_3$) | 11 |

*Formula No. 3*

| | Parts by weight |
|---|---|
| Borax | 25 |
| Oxide of iron | 13 |
| Bicarbonate of soda | 12 |
| Copper chloride | 6 |
| Phosphor-copper (15%) | 22 |
| Molybdic oxide ($MoO_3$) | 10 |
| Ammonium persulphate | 12 |

*Formula No. 4*

| | Parts by weight |
|---|---|
| Borax | 38 |
| Oxide of iron | 19 |
| Bicarbonate of soda | 18 |
| Phosphor-copper (15%) | 25 |

Still other formulas giving satisfactory results are the following:

*Formula No. 5*

| | Parts by weight |
|---|---|
| Borax | 28 |
| Oxide of iron | 14 |
| Bicarbonate of soda | 7 |
| Sulphide of iron | 14 |
| Ammonium molybdate | 10 |
| Ferro-manganese (85%) | 27 |

*Formula No. 6*

| | Parts by weight |
|---|---|
| Borax | 43 |
| Oxide of iron | 21 |
| Bicarbonate of soda | 20 |
| Sulphide of iron | 16 |

A suitable binder is employed with each formula for securing the compositions to the rod.

The proportions mentioned are only approximate and are given by way of examples only. The different compositions and proportions used may be varied considerably. For instance, borax, bicarbonate of soda and the iron oxide may be varied 25 percent either way if only one be changed at a time. If all are changed, each may be varied within the limits of 5 percent either way. Sulphide of iron and ferro-manganese may be increased as much as 20 percent or decreased as much as 50 percent. The phosphor-copper and copper chloride may be doubled without any appreciable extra result but if decreased 10 or 20 percent, the weld is not so good because it is harder. The ammonium molybdate and ammonium persulphate may be doubled or may be reduced 50 percent but the latter is not very effective.

In the preparation of the coating, the ingredients are ground to a fine powder that will pass 200-mesh or finer. The reduced compositions are then thoroughly mixed and applied to the rod by a suitable binder. Preferably, though not necessarily, this binder is of non-carbonaceous material, such, for instance, as sodium silicate, zinc phosphate, or other phosphates, such as the phosphates of the alkali earth metals, or the like. A clear, quick drying lacquer of the type useful in lacquering metal, quick drying varnishes, or glue solutions, may also be used. Any suitable binder that is not too high in carbon content may be used. When a binder is used that does not react on any of the other ingredients, the binder is preferably mixed with the ground composition to a suitable consistency, preferably a thin paste, and the coating then applied to the rods by dipping the rods therein and permitting the excess to drain off, or if desired, the extrusion method may be employed. If the extrusion method be used, the paste is made thicker. If sodium silicate be employed as a binder, the coating may be applied by first dipping the rods in the liquid sodium silicate and then sprinkling the powder on the rods and then drying the coat. Where the lacquer is employed in the extrusion method, the lacquer may be thickened or caused to jell by the addition of potassium permanganate, chromic acid or an alkaline chromate ($NaCrO_4$, $KCrO_4$, $Na_2Cr_2O_7$ or $K_2Cr_2O_7$).

If desired, a small amount of clay or bentonite may be added to thicken the mixture and to aid in the dispersion of the compositions. This is especially useful in thickening the mixture if the extrusion method is to be employed. If desired, inert fillers, such as clay or the like, may be added to the mixture which do not have any marked effect on the weld, either beneficially or harmfully.

Not only do rods coated with the mixtures recited above work well on cast iron, but they are also applicable to malleable iron and steel with good results. Some of the mixtures are especially well suited to high speed welding on steel. For example, the mixture given in Formula No. 4 makes it possible to deposit weld metal at a rate of about 40 percent faster than other rods commercially available. This coating conducts the current and speeds up the rate of deposition. Because of the conducting capacity of the coating, it is unnecessary to have bare metal exposed, either for striking the arc or for holding the rod.

Welding may be done on any cast iron and without preheating, but the softer the iron, the softer the deposits. But even on cast iron, the Brinell hardness number of the deposit is usually below 200. Polarity of the current may be either direct or reverse but the amperage should be as low as is possible to use under the conditions encountered in welding. It is also advisable to employ more than a single bead whenever possible. This is considered an important feature of the invention. Single beads will, in general, be somewhat harder than multiple beads. The above process prevents the formation of white iron to a marked extent, but under adverse conditions, there may be formed a layer, very thin in extent, of somewhat tougher metal that is not as readily machined as the top layers.

In usual commercial practice, the rods used are approximately ⅛ inch in diameter. In the present invention, rods up to ¼ inch in diameter may be used. In the use of commercial rods, the rate of welding must be kept low, small rods used and depositions carried on intermittenly in order to obtain deposits that have any usefulness. But with rods coated with the above materials, it is possible to conduct the welding operation continuously and at a uniform rate of movement of the electrode.

The success of the above method of welding does not depend on the proportions of the compounds listed in the various formulas as the proportions may be varied without departing from the spirit of the invention nor is it necessary that various chemical compositions employed be chemically pure as the commercial form of the ingredients give satisfactory results. For instance, the commercial iron oxide may contain only from 50 to 98 percent iron oxide ($Fe_2O_3$) but that is sufficient. The commercial form of ferromanganese contains 84 to 86 percent of manganese. Likewise the commercial form of phosphor-copper alloy containing approximately 15 percent phosphorus gives satisfactory results.

I claim as my invention:

1. A welding electrode comprising a rod of ferrous material of low carbon content having secured to the surface thereof a coat comprising borax as the principal ingredient but not to exceed 50% of the composition coating, bicarbonate of soda in a substantial amount, oxide of iron in a substantial amount, said bicarbonate of soda and oxide of iron being of substantially the same amount and together not greater than 50% nor less than 25% of the composition coating, and a binder.

2. A welding electrode for use in welding cast iron comprising a metallic rod composed principally of ferrous material of low carbon content coated with a mixture of the following materials:

| | Parts by weight |
|---|---|
| Borax | Between 19 and 62 |
| Oxide of iron | Between 10 and 31 |
| Bicarbonate of soda | Between 6 and 31 |
| Phosphor-copper (15%) | Between 18 and 50 | and a binder.

3. A welding electrode for use in welding cast iron comprising a rod of ferrous material of low carbon content having a finely ground mixture thereon of borax constituting from 19% to 62% of the mixture, bicarbonate of soda, and oxide of iron of substantially the same amounts secured to said rod by a non-carbonaceous binder.

4. A welding electrode for use in welding cast iron comprising a rod of ferrous material having a coating of water glass on which a coating of a ground mixture of borax from 20% to 60% of the mixture, bicarbonate of soda and oxide of iron of substantially equal amounts, the amount of each being less than that of borax, are held by said water glass.

5. A welding electrode for use in welding cast iron comprising a metallic rod composed principally of ferrous material coated with a mixture of the following materials in substantially the proportions indicated:

| | Parts by weight |
|---|---|
| Borax | 29 |
| Oxide of iron | 14 |
| Bicarbonate of soda | 14 |
| Copper chloride | 7 |
| Phosphor-copper (15%) | 25 |
| Molybdic oxide ($MoO_3$) | 11 |

6. A welding electrode for use in welding cast iron comprising a metallic rod composed principally of ferrous material of low carbon content coated with a mixture of the following materials: borax, oxide of iron, bicarbonate of soda, copper chloride, phosphor-copper (15%), molybdic oxide ($MoO_3$), and ammonium persulphate.

7. A welding electrode for use in welding cast iron comprising a ferrous rod of low carbon content covered by a coat comprising borax constituting the principal ingredient but not greater than 50% of the composition of said coat, iron oxide from 13% to 25%, bicarbonate of soda from 7% to 25%, a binder, and a deoxidizing agent.

8. A welding electrode for use in electric arc welding of cast iron metal comprising a rod of wrought iron covered by composition including borax not greater than 50% nor less than 25% of the composition, and iron oxide and bicarbonate of soda, said iron oxide and bicarbonate of soda being used in substantially the same amounts and their combined amounts being not substantially greater than the amount of borax used.

9. A cast iron member having a weld of ferrous material thereon sufficiently soft to be machined having the properties of a weld that had been deposited by an electrode having thereon a coating comprising a mixture of the following materials:

| | Parts by weight |
|---|---|
| Borax | 19 to 62 |
| Bicarbonate of soda | 6 to 31 |
| Oxide of iron | 10 to 31 | and a binder.

10. A welding electrode for use in welding cast iron metal comprising a wrought iron rod surrounded by a coat of electric conducting material including borax as the principal ingredient and between 25% and 38% of the coat composition, phosphor-copper between 22% and 25% of the coat composition, and iron oxide secured to said rod by a non-carbonaceous binder.

11. A welding electrode comprising a metallic rod composed principally of ferrous material coated with a mixture of the following materials:

| | Parts by weight |
|---|---|
| Borax | 38 |
| Oxide of iron | 19 |
| Bicarbonate of soda | 18 |
| Phosphor-copper (15%) | 25 | and a binder.

12. A welding electrode for use in arc welding, comprising a ferrous rod of low carbon content enclosed in a coat of material comprising finely ground borax as the principal ingredient, oxide of iron between 13% and 19% of the coat composition, bicarbonate of soda from 12% to 18%, and phosphor-copper approximately 25% of the composition secured to said rod by a binder.

13. A welding electrode comprising a metallic rod composed principally of ferrous material coated with a mixture of the following materials in substantially the proportions indicated:

| | Parts by weight |
|---|---|
| Borax | 25 |
| Oxide of iron | 13 |
| Bicarbonate of soda | 12 |
| Copper chloride | 6 |
| Phosphor-copper (15%) | 22 |
| Molybdic oxide ($MoO_3$) | 10 |
| Ammonium persulphate | 12 | and a binder.

14. A welding electrode for use in arc welding comprising a ferrous metal rod of low carbon content having attached thereto by a clear, quick drying metal lacquer, a coat of material comprising borax 25% to 50%, oxide of iron 13% to 25%, bicarbonate of soda 7% to 25%, and a filler.

15. A process of welding cast iron which comprises depositing a single coat of soft ferrous metal on the parts to be welded, without preheating those parts, from an electrode of ferrous material of low carbon content covered by a coating containing a flux as the principal ingredient, a ferrous composition, bicarbonate of soda and a deoxidizing agent secured on said rod by a non-carbonaceous binder whereby the formation of a substantial amount of white iron in contact with the welded surface will be prevented so that said weld may be easily machined.

16. A welding electrode for use in welding cast iron comprising a rod of ferrous material of low carbon content coated with a mixture of the following materials:

| | Parts by weight |
|---|---|
| Borax | 19 to 62 |
| Oxide of iron | 10 to 31 |
| Bicarbonate of soda | 6 to 31 |
| Copper chloride | 5 to 14 |
| Phosphor-copper (15%) | 18 to 50 |
| Molybdic oxide ($MoO_3$) | 5 to 22 | and a binder.

GLENN V. IRELAND.